US006811167B2

(12) United States Patent
Coombs et al.

(10) Patent No.: US 6,811,167 B2
(45) Date of Patent: Nov. 2, 2004

(54) SUSPENSION SYSTEM FOR A VEHICLE (75) Inventors: Joshua D. Coombs, Whitmore Lake, MI (US); Jeremy Edmondson, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/182,845

(22) PCT Filed: Dec. 7, 2001

(86) PCT No.: PCT/US01/48488
§ 371 (c)(1),
(2), (4) Date: Dec. 26, 2002

(87) PCT Pub. No.: WO02/45982
PCT Pub. Date: Jun. 13, 2002

(65) Prior Publication Data
US 2003/0168828 A1 Sep. 11, 2003

Related U.S. Application Data
(60) Provisional application No. 60/251,951, filed on Dec. 7, 2000.

(51) Int. Cl.[7] .............................................. B60G 15/07
(52) U.S. Cl. ..................... 280/124.154; 280/124.157; 280/124.158; 280/124.159
(58) Field of Search ................... 280/124.1, 124.112, 280/124.157, 124.158, 124.159, 124.16

(56) References Cited

U.S. PATENT DOCUMENTS

| 2,070,440 A | | 2/1937 | Maddin | |
| 3,154,317 A | | 10/1964 | Gustafsson | |
| 3,582,106 A | * | 6/1971 | Keijzer | 267/64.19 |
| 3,603,576 A | | 9/1971 | Hahn | |
| 3,627,348 A | | 12/1971 | Klees et al. | |
| 3,653,676 A | * | 4/1972 | Higginbotham | 280/6.159 |
| 3,709,517 A | | 1/1973 | Wossner | |
| 3,895,816 A | * | 7/1975 | Takahashi et al. | 280/5.503 |
| 3,895,820 A | * | 7/1975 | Takahashi et al. | 280/6.158 |
| 3,961,336 A | * | 6/1976 | Walker et al. | 346/139 C |
| 4,441,593 A | | 4/1984 | Axthammer | |
| 4,556,718 A | * | 12/1985 | Chastrette et al. | 549/449 |
| 4,634,143 A | | 1/1987 | Asami et al. | |
| 4,659,106 A | * | 4/1987 | Fujita et al. | 280/124.103 |
| 4,696,489 A | | 9/1987 | Fujishiro et al. | |

(List continued on next page.)

FOREIGN PATENT DOCUMENTS

| EP | 0 279 507 A2 | 8/1988 |
| EP | 0 427 046 A1 | 5/1991 |

OTHER PUBLICATIONS

S. Ikenaga et al., *Active Suspension Control Using a Novel Strut and Active Filtered Feedback Design and Implementation*, Proceedings of the 1999 IEEE International Conference on Control Applications, Kohala Coast–Island of Hawaii, Hawaii, Aug. 22–27, 1999, pp. 1502–1508.
See Attachment A.
See Attachment B.
European Search Report.

Primary Examiner—Paul N. Dickson
Assistant Examiner—Toan C To
(74) Attorney, Agent, or Firm—Brinks Hofer Gilson & Lione (57) ABSTRACT Suspension system (10) includes a compressible fluid (12), a suspension strut (14), a hydraulic cavity (16), a reservoir (18), and a volume modulator (20). The hydraulic cavity (16) is at least partially defined by the suspension strut (14) and is adapted to contain a portion of the compressible fluid (12). The hydraulic cavity (16) and the compressible fluid (12) supply a suspending spring force that biases a wheel (22) of a vehicle toward the road surface. The volume modulator (20) selectively pushes the compressible fluid (12) into the hydraulic cavity (16) and vents the compressible fluid (12) from the hydraulic cavity (16), thereby actively modulating the suspending spring force.

21 Claims, 5 Drawing Sheets

U.S. PATENT DOCUMENTS

| | | | | |
|---|---|---|---|---|
| 5,011,180 A | | 4/1991 | Dunwoody | |
| 5,020,826 A | * | 6/1991 | Stecklein et al. | 280/124.159 |
| 5,054,808 A | * | 10/1991 | Tsukamoto | 280/5.5 |
| 5,098,119 A | * | 3/1992 | Williams et al. | 280/5.507 |
| 5,105,358 A | * | 4/1992 | Takase et al. | 701/37 |
| 5,130,926 A | * | 7/1992 | Watanabe et al. | 701/37 |
| 5,137,299 A | | 8/1992 | Jones | |
| 5,152,547 A | | 10/1992 | Davis | |
| 5,156,645 A | * | 10/1992 | Tsukamoto et al. | 280/5.501 |
| 5,231,583 A | | 7/1993 | Lizell | |
| 5,239,471 A | * | 8/1993 | Takahashi | 701/37 |
| 5,259,738 A | | 11/1993 | Salter et al. | |
| 5,261,455 A | * | 11/1993 | Takahashi et al. | 137/625.64 |
| 5,265,913 A | * | 11/1993 | Scheffel | 280/6.158 |
| 5,316,272 A | | 5/1994 | Davis | |
| 5,348,338 A | | 9/1994 | Kuriki et al. | |
| 5,351,790 A | * | 10/1994 | Machida | 188/314 |
| 5,522,481 A | | 6/1996 | Watanabe | |
| 5,572,425 A | | 11/1996 | Levitt et al. | |
| 5,577,579 A | | 11/1996 | Derr | |
| 5,584,498 A | * | 12/1996 | Danek | 280/5.503 |
| 5,627,751 A | | 5/1997 | Davis et al. | |
| 5,769,400 A | | 6/1998 | Holzl et al. | |
| 6,145,859 A | | 11/2000 | Altherr et al. | |
| 6,264,212 B1 | | 7/2001 | Timoney | |
| 6,293,530 B1 | | 9/2001 | Delorenzis et al. | |
| 6,305,673 B1 | | 10/2001 | Delorenzis et al. | |
| 6,328,125 B1 | * | 12/2001 | Van Den Brink et al. | 180/211 |
| 6,389,341 B1 | | 5/2002 | Davis | |

* cited by examiner

SUSPENSION SYSTEM FOR A VEHICLE

CROSS-REFERENCE TO RELATED APPLICATIONS

This application is a U.S. national stage filing of international application number PCT/US01/48488, filed Dec. 7, 2001 and claims priority to U.S. provisional application No. 60/251,951, filed Dec. 7, 2000.

TECHNICAL FIELD

The subject matter of this invention generally relates to suspension systems for a vehicle and, more particularly, to suspension systems including a compressible fluid.

BACKGROUND

In the typical vehicle, a combination of a coil spring and a gas strut function to allow compression movement of a wheel toward the vehicle and rebound movement of the wheel toward the ground. The suspension struts attempt to provide isolation of the vehicle from the roughness of the road and resistance to the roll of the vehicle during a turn. More specifically, the typical coil spring provides a suspending spring force that biases the wheel toward the ground and the typical gas strut provides a damping force that dampens both the suspending spring force and any impact force imparted by the road. Inherent in every conventional suspension strut is a compromise between ride (the ability to isolate the vehicle from the road surface) and handling (the ability to resist roll of the vehicle). Vehicles are typically engineered for maximum road isolation (found in the luxury market) or for maximum roll resistance (found in the sport car market). There is a need, however, for an improved suspension system that avoids this inherent compromise.

DETAILED DESCRIPTION OF THE PREFERRED EMBODIMENT

The following description of the preferred embodiment of the invention is not intended to limit the invention to the preferred embodiment, but rather to enable any person skilled in the art of suspension systems to use this invention.

Figure 1:
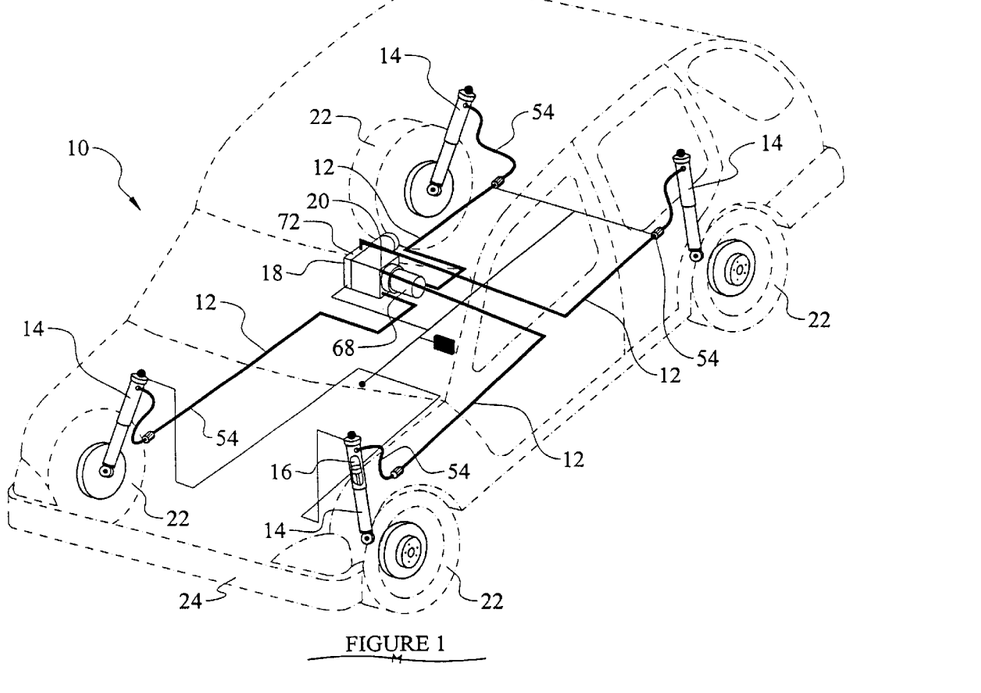
FIG. 1 is a cut away perspective view of the suspension system of the preferred embodiment, shown within a vehicle.

As shown in FIG. 1, the suspension system 10 of the preferred embodiment includes a compressible fluid 12, a suspension strut 14, a hydraulic cavity 16, a reservoir 18, and a volume modulator 20. The hydraulic cavity 16, which is at least partially defined by the suspension strut 14, contains a portion of the compressible fluid 12 and cooperates with the compressible fluid 12 to supply a suspending spring force. The suspending spring force biases a wheel 22 of the vehicle 24 toward the surface. The volume modulator 20, which is coupled to the hydraulic cavity 16 and to the reservoir 18, selectively pushes the compressible fluid 12 from the reservoir 18 into the hydraulic cavity 16 and vents the compressible fluid 12 from the hydraulic cavity 16 into the reservoir 18, thereby actively modulating the suspending spring force. By increasing the suspending spring force in the suspension struts 14 of the outside wheels during a turn, the vehicle 24 can better resist roll. By decreasing the suspending spring force over rough surfaces, the vehicle 24 can better isolate the passengers. Thus, by actively modulating the suspending spring force, the vehicle 24 can maximize both ride and handling and avoid the inherent compromise of conventional suspension systems.

Figure 2:
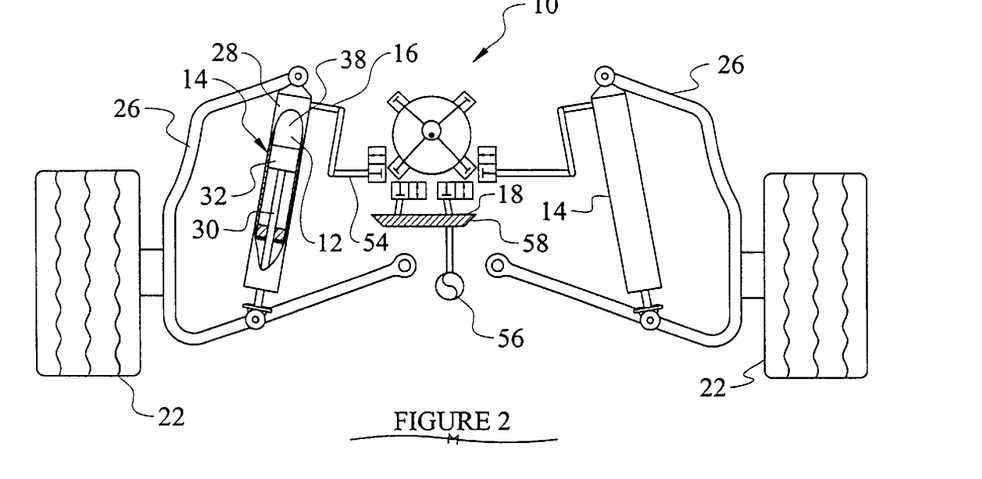
FIG. 2 is a schematic view of the suspension system of FIG. 1.

As shown in FIGS. 1 and 2, the suspension system 10 of the preferred embodiment has been specifically designed for a vehicle 24 having four wheels 22 and four suspension links 26 (two shown in FIG. 2) suspending the individual wheels 22 from the vehicle 24. The suspension links 26 allow compression movement of the individual wheels 22 toward the vehicle 24 and rebound movement of the individual wheels toward the road surface. Despite this design for a particular environment, the suspension system 10 may be used in any suitable environment, such as other vehicles with more or less wheels.

The compressible fluid 12 of the preferred embodiment, which cooperates to supply the suspending spring force, is preferably a silicon fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component, that provides a larger compressibility above 2,000 psi than conventional hydraulic oil.

Figure 3:
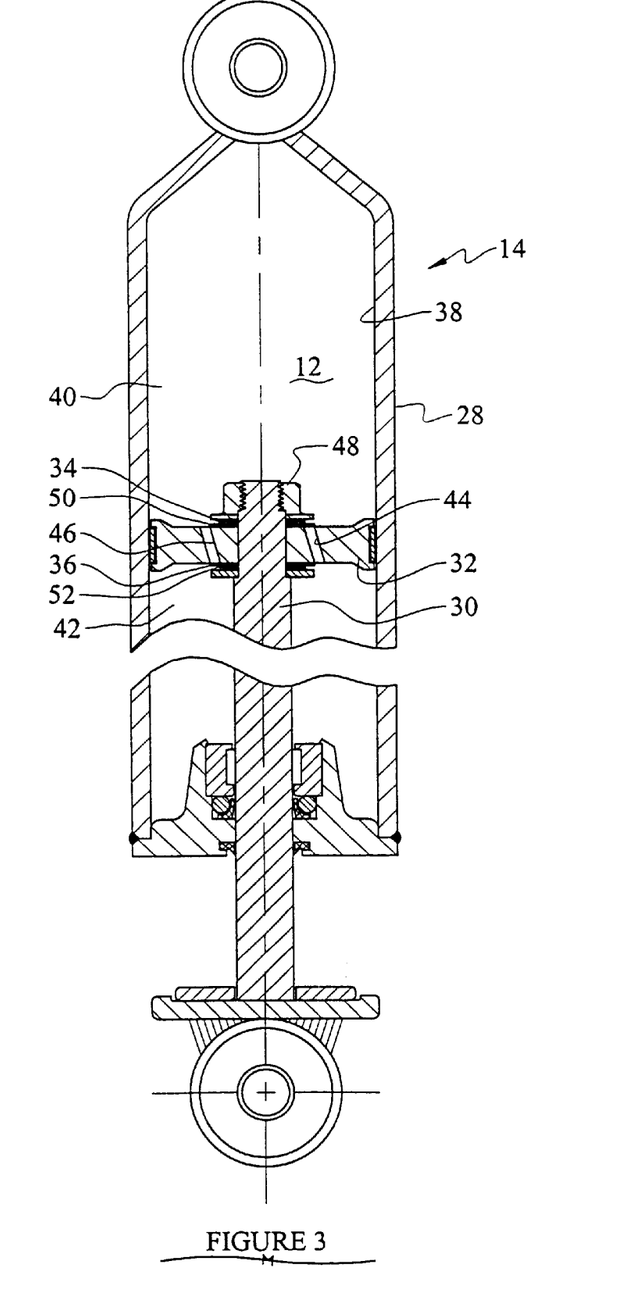
FIG. 3 is a cross-sectional view of a suspension strut of the suspension system of FIG. 1.

As shown in FIGS. 2 and 3, the suspension strut 14 of the preferred embodiment includes a hydraulic tube 28, a displacement rod 30, a cavity piston 32, a first variable restrictor 34, and a second variable restrictor 36. The hydraulic tube 28 and displacement rod 30 of the preferred embodiment cooperatively function to couple the suspension link and the vehicle and to allow compression movement of the wheel 22 toward the vehicle and rebound movement of the wheel 22 toward the road surface. The hydraulic tube 28 preferably defines an inner cavity 38, which functions to contain a portion of the compressible fluid 12. As previously mentioned, the inner cavity 38 and the compressible fluid 12 preferably cooperate to supply the suspending spring force that biases the wheel 22 toward the surface and, essentially, suspend the entire vehicle above the surface. The displacement rod 30 is adapted to move into the inner cavity 38 upon the compression movement of the wheel 22 and to move out of the inner cavity 38 upon the rebound movement of the wheel 22. As it moves into the inner cavity 38, the displacement rod 30 displaces, and thereby compresses, the compressible fluid 12. In this manner, the movement of the displacement rod 30 into the inner cavity 38 increases the suspending spring force of the suspension strut 14. As the displacement rod 30 moves out of the inner cavity 38, the compressible fluid 12 decompresses and the suspending spring force of the suspension strut 14 decreases. The displacement rod 30 is preferably cylindrically shaped and, because of this preference, the displacement of the displacement rod 30 within the inner cavity 38 and the magnitude of the suspending spring force have a linear relationship. If a linear relationship is not preferred for the particular application of the suspension strut 14, or if there is any other appropriate reason, the displacement rod 30 may be alternatively designed with another suitable shape. The hydraulic tube 28 and the displacement rod 30 are preferably made from conventional steel and with conventional methods, but may alternatively be made from any suitable material and with any suitable method.

The cavity piston 32 of the preferred embodiment is preferably coupled to the displacement rod 30 and preferably extends to the hydraulic tube 28. In this manner, the cavity piston 32 separates the inner cavity 38 into a first section 40 and a second section 42. The cavity piston 32 defines a first orifice 44 and a second orifice 46, which both preferably extend between the first section 40 and the second section 42 of the inner cavity 38. The first orifice 44 and the second orifice 46 function to allow flow of the compressible fluid 12 between the first section 40 and the second section 42 of the inner cavity 38. The cavity piston 32 is preferably securely mounted to the displacement rod 30 by a conventional fastener 48, but may alternatively be integrally formed with the displacement rod 30 or securely mounted with any suitable device. The cavity piston 32 is preferably made from conventional materials and with conventional methods, but may alternatively be made from other suitable materials and with other suitable methods.

The first variable restrictor 34 of the preferred embodiment is coupled to the cavity piston 32 near the first orifice 44. The first variable restrictor 34 functions to restrict the passage of the compressible fluid 12 through the first orifice 44 and, more specifically, functions to variably restrict the passage based on the velocity of the cavity piston 32 relative to the hydraulic tube 28. In the first preferred embodiment, the first variable restrictor 34 is a first shim stack 50 preferably made from conventional materials and with conventional methods. In alternative embodiments, the first variable restrictor 34 may include any other suitable device able to variably restrict the passage of the compressible fluid 12 through the first orifice 44 based on the velocity of the cavity piston 32 relative to the hydraulic tube 28. The second variable restrictor 36 of the preferred embodiment is coupled to the cavity piston 32 near the second orifice 46. The second variable restrictor 36—like the first variable restrictor 34—functions to restrict the passage of the compressible fluid 12 through the second orifice 46 and, more specifically, functions to variably restrict the passage based on the velocity of the cavity piston 32 relative to the hydraulic tube 28. In the preferred embodiment, the second variable restrictor 36 is a second shim stack 52 preferably made from conventional materials and with conventional methods. In alternative embodiments, the second variable restrictor 36 may include any suitable device able to variably restrict a passage of the compressible fluid 12 through the second orifice 46 based on the velocity of the cavity piston 32 relative to the hydraulic tube 28.

The cavity piston 32, the first orifice 44, and the first variable restrictor 34 of the preferred embodiment cooperate to supply the rebound damping force during the rebound movement of the wheel 22. The rebound damping force acts to dampen the suspending spring force that tends to push the displacement rod 30 out of the hydraulic tube 28. The cavity piston 32, the second orifice 46, and a second variable restrictor 36, on the other hand, cooperate to supply the compression damping force during the compression movement of the wheel 22. The compression damping force acts to dampen any impact force that tends to push the displacement rod 30 into the hydraulic tube 28.

The suspension strut 14 of the preferred embodiment is further described in U.S. application filed on Dec. 7, 2001, entitled "Compressible Fluid Strut", and assigned to Visteon Global Technologies, Inc. As described in that application, the suspension strut may include a pressure vessel and may include a valve. In alternative embodiments, the suspension strut may include any suitable device to allow active modulation of the suspending spring force with compressible fluid.

As shown in FIG. 1, the suspension system 10 of the preferred embodiment also includes hydraulic lines 54 adapted to communicate the compressible fluid 12 between the individual suspension struts 14 and the volume modulator 20. Together with the inner cavity 38 of the individual suspension struts 14, the hydraulic lines 54 define individual hydraulic cavities 16. Preferably, the compressible fluid 12 flows freely between the volume modulator 20 and the inner cavity 38 of the individual suspension struts 14. Alternatively, the hydraulic cavities 16 may include one or more controllable valves such that the hydraulic cavity 16 is entirely defined by the suspension strut 14 or by the suspension strut 14 and a portion of the hydraulic line 54.

As shown in FIG. 2, the reservoir 18 functions to contain a portion of the compressible fluid 12 that has been vented from the hydraulic cavity 16 and that may eventually be pushed into the hydraulic cavity 16. The reservoir 18 is preferably made from conventional materials and with conventional methods, but may alternatively be made from any suitable material and with any suitable method. The suspension system 10 of the preferred embodiment includes a pump 56 adapted to pressurize the compressible fluid 12 within the reservoir 18. In this manner, the reservoir 18 acts as an accumulator 58. By using compressible fluid 12 under a pressure of about 1500 psi within the reservoir 18, the volume modulator 20 consumes less energy to reach a particular pressure within an individual hydraulic cavity 16. In an alternative embodiment, the compressible fluid 12 within the reservoir 18 may be at atmospheric pressure or may be vented to the atmosphere.

As shown in FIG. 2, the volume modulator 20 is coupled to the hydraulic line 54 and to the reservoir 18. The volume modulator 20, as previously mentioned, functions to selectively push the compressible fluid 12 into the hydraulic cavity 16 and to vent the compressible fluid 12 from the hydraulic cavity 16. In the preferred embodiment, the volume modulator 20 is a digital displacement pump/motor as described in U.S. Pat. No. 5,259,738 entitled "Fluid-Working Machine" and issued to Salter et al. on 9 Nov. 1993, which is incorporated in its entirety by this reference. In alternative embodiments, the volume modulator 20 may be any suitable device that selectively pushes the compressible fluid 12 into the hydraulic cavity 16 and vents the compressible fluid 12 from the hydraulic cavity 16 at a sufficient rate to actively modulate the suspending spring force.

Figure 4:
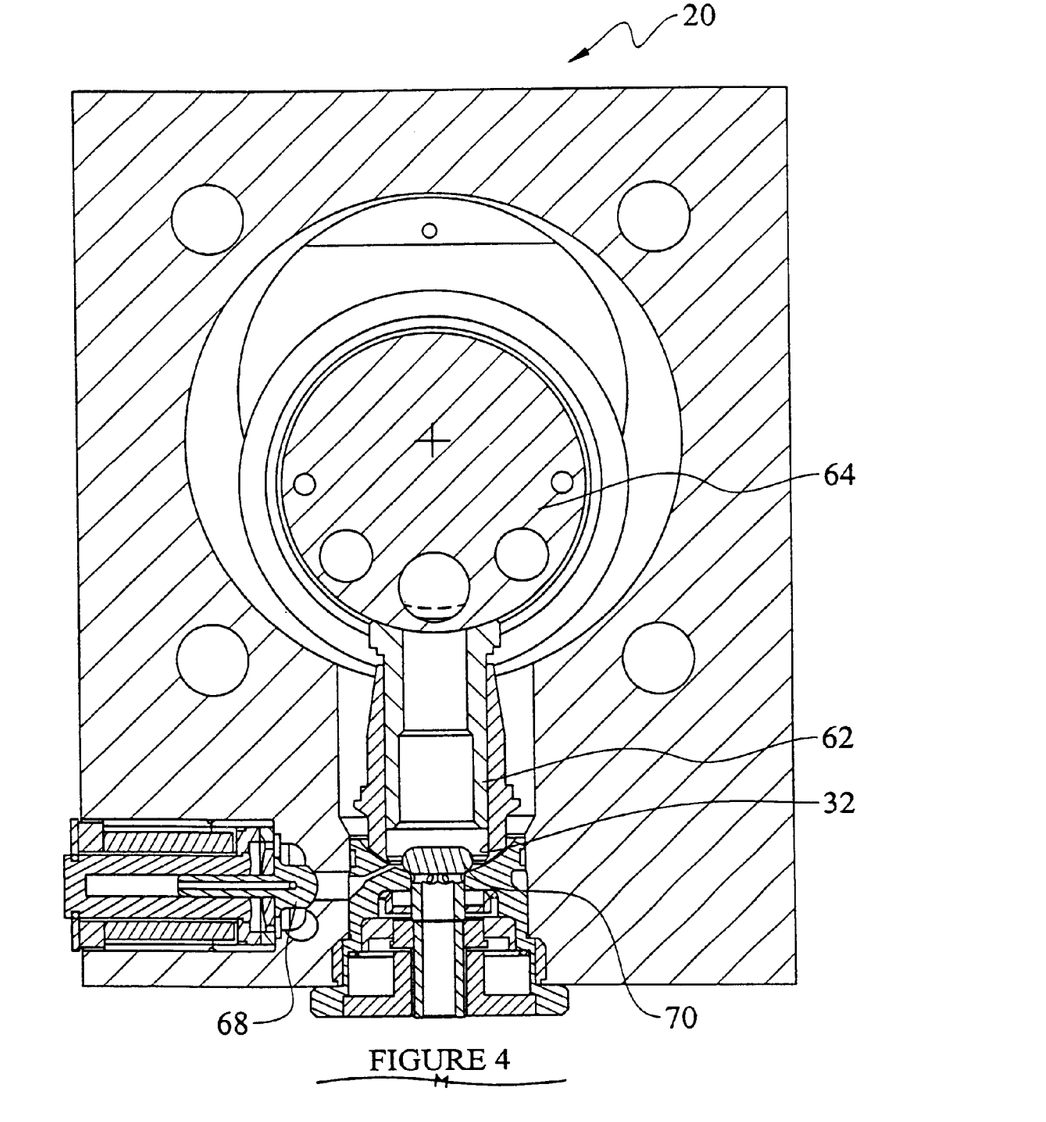
FIG. 4 is a detailed view of the volume modulator of the suspension system of FIG. 1.

As shown in FIG. 4, the volume modulator 20 of the preferred embodiment defines a modulator cavity 60 and includes a modulator piston 62 adapted to continuously cycle through a compression stroke and an expansion stroke within the modulator cavity 60. The modulator piston 62 is preferably connected to an eccentric 64 that is rotated by a motor 66 (shown in FIG. 1). Because of the "active" nature of the modulation of the suspending spring force, the modulator piston 62 cycles through the compression stroke and expansion stroke at a relatively high frequency (up to 30 Hz) and, thus, the motor preferably rotates at a relatively high rotational velocity (up to 2000 rpm).

The volume modulator 20 of the preferred embodiment also includes a cavity-side valve 68 coupled between the hydraulic line and the volume modulator 20 and a reservoir-side valve 70 coupled between the reservoir and the volume modulator 20. The cavity-side valve 68 and the reservoir-side valve 70 function to selectively restrict the passage of the compressible fluid. Preferably, the cavity-side valve 68 and the reservoir-side valve 70 are so-called poppet valves that may be actuated at relatively high frequencies. Alternatively, the cavity-side valve 68 and the reservoir-side valve 70 may be any suitable device that selectively restricts the passage of the compressible fluid at an adequate frequency.

Figure 5A:
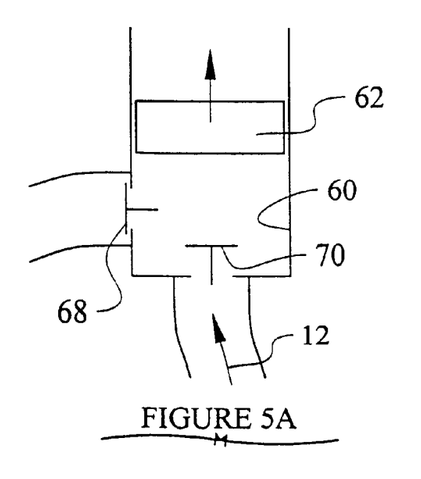
FIGS. 5A, 5B, 6A, and 6B are schematic, views of the different stages of the volume modulator of FIG. 4.
Figure 5B:
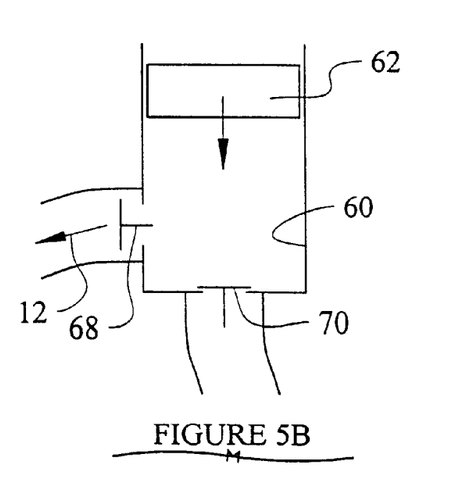

As shown in FIGS. 5A and 5B, the cavity-side valve 68, the reservoir-side valve 70, and the modulator piston 62 can cooperate to draw compressible fluid 12 from the reservoir and push the compressible fluid 12 into the hydraulic cavity. In the first stage, as shown in FIG. 5A, the cavity-side valve 68 is closed and the reservoir-side valve 70 is opened, while the modulator piston 62 increases the volume in the modulator cavity 60 (the expansion stroke). The expansion stroke of the modulator piston 62 draws the compressible fluid 12 into the modulator cavity 60. During the second stage, as shown in FIG. 5B, the reservoir-side valve 70 is closed and the cavity-side valve 68 is opened, while the modulator piston 62 decreases the volume in the modulator cavity 60 (the compression stroke). The compression stroke of the modulator piston 62 pushes the compressible fluid 12 into the hydraulic cavity, which increases the suspending spring force at that particular suspension strut and wheel.

Figure 6A:
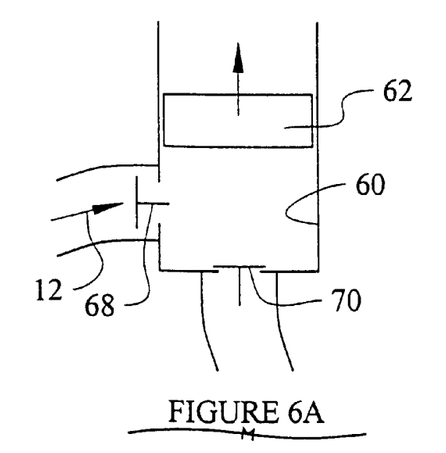
Figure 6B:
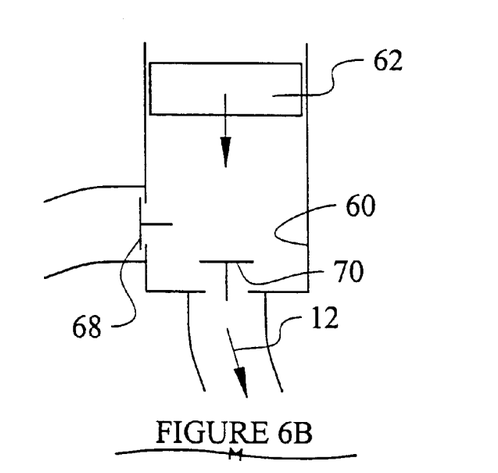

As shown in FIGS. 6A and 6B, the cavity-side valve 68, the reservoir-side valve 70, and the modulator piston 62 can also cooperate to draw compressible fluid 12 from the hydraulic cavity and vent the compressible fluid 12 into the reservoir. In the first stage, as shown in FIG. 6A, the cavity-side valve 68 is opened and the reservoir-side valve 70 is closed, while the modulator piston 62 increases the volume in the modulator cavity 60 and draws the compressible fluid 12 into the modulator cavity 60. During the second stage, as shown in FIG. 6B, the reservoir-side valve 70 is opened and the cavity-side valve 68 is closed, while the modulator piston 62 decreases the volume in the modulator cavity 60 and vents the compressible fluid 12 into the reservoir, which decreases the suspending spring force at that particular suspension strut and wheel.

During the operation of the vehicle, it may be advantageous to neither increase nor decrease the suspending spring force. Since the motor 66, the eccentric 64, and the modulator pistons 62 are continuously moving, the reservoir-side valve 70 and the volume modulator 20 can also cooperate to draw compressible fluid 12 from the reservoir (shown in FIG. 5A) and vent the compressible fluid 12 back into the reservoir (shown in FIG. 6B). This process does not modulate the pressure of the hydraulic cavity 16 and does not increase or decrease the suspending spring force.

Although FIGS. 5A, 5B, 6A, and 6B show only one modulator cavity 60 and modulator piston 62, the volume modulator 20 preferably includes a modulator cavity 60, a modulator piston 62, a cavity-side valve 68, and a reservoir-side valve 70 for each suspension strut 14 on the vehicle 24. Preferably, the motor 66 and the eccentric 64 drive the multiple modulator pistons 62, but the individual modulator pistons 62 may alternatively be driven by individual motors and individual eccentrics. Further, a control unit 72 (shown in FIG. 1) may individually control the cavity-side valve 68 and reservoir-side valve 70 corresponding to a particular suspension strut 14 and wheel 22 to adjust the ride and handling of the vehicle 24 on a wheel-to-wheel basis. The control unit 72 may also be used to adjust particular suspension struts 14 on a side-by-side basis of the vehicle 24 to adjust the roll or the pitch of the vehicle 24. The control unit 72 may further be used to adjust all of the suspension struts 14 to adjust the ride height of the vehicle 24. The control unit 72 is preferably made from conventional material and with conventional methods, but may alternatively be made from any suitable material and with any suitable method.

As any person skilled in the art of suspension systems will recognize from the previous detailed description and from the figures and claims, modifications and changes can be made to the preferred embodiment of the invention without departing from the scope of this invention defined in the following claims.

We claim:

1. A suspension system for a vehicle having a wheel contacting a surface under the vehicle and a suspension link suspending the wheel from the vehicle and allowing relative movement of the wheel and the vehicle, said suspension system comprising:
   a compressible fluid;
   a suspension strut adapted to couple the suspension link and the vehicle;
   a hydraulic cavity at least partially defined by said suspension strut and adapted to contain a portion of said compressible fluid and to cooperate with said compressible fluid to supply a suspending spring force that biases the wheel toward the surface;
   a reservoir adapted to contain a portion of said compressible fluid; and
   a volume modulator fluidically connected to said hydraulic cavity and said reservoir and adapted to selectively push said compressible fluid into said hydraulic cavity and vent said compressible fluid from said hydraulic cavity, thereby actively modulating said suspending spring force, wherein said volume modulator defines a modulator cavity receiving compressible fluid and includes a modulator piston adapted to cycle through a compression stroke and an expansion stroke within said modulator cavity for pushing compressible fluid from or drawing compressible fluid into the modulator cavity, a controllable cavity-side valve coupled between said hydraulic cavity and said volume modulator and adapted to selectively restrict the passage of said compressible fluid between said hydraulic cavity and said modulator cavity, and a controllable reservoir-side valve coupled between said reservoir and said volume modulator and adapted to selectively restrict the passage of said compressible fluid between said reservoir and said modulator cavity.

2. The suspension system of claim 1 wherein said suspension strut includes a displacement rod adapted to move into said hydraulic cavity and to compress said compressible fluid upon the relative movement of the wheel and the vehicle.

3. The suspension system of claim 2 wherein said displacement rod includes a cavity piston adapted to supply a damping force.

4. The suspension system of claim 1 wherein said hydraulic cavity is defined by said suspension strut and a hydraulic line adapted to communicate said compressible fluid between said suspension strut and said volume modulator.

5. The suspension system of claim 1 wherein said compressible fluid includes a silicone fluid.

6. The suspension system of claim 1 wherein said compressible fluid has a larger compressibility above 2,000 psi than hydraulic oil.

7. The suspension system of claim 1 wherein said compressible fluid is adapted to compress about 1.5% volume at 2,000 psi, about 3% volume at 5,000 psi, and about 6% volume at 10,000 psi.

8. The suspension system of claim 1 further comprising an electric control unit coupled to said volume modulator and adapted to close said cavity-side valve and open said reservoir-side valve during said expansion stroke and to open said cavity-side valve and close said reservoir-side valve during said compression stroke, thereby pushing said compressible fluid into said hydraulic cavity.

9. The suspension system of claim 8 wherein said electronic control unit is further adapted to open said cavity-side valve and close said reservoir-side valve during said expansion stroke and to close said cavity-side valve and open said reservoir-side valve during said compression stroke, thereby venting said compressible fluid from said hydraulic cavity.

10. The suspension system of claim 1 further comprising a pump adapted to pressurize said compressible fluid within said reservoir.

11. The suspension system of claim 1 wherein said compressible fluid is pressurized in said reservoir to a predetermined amount above atmospheric pressure.

12. A suspension system for a vehicle having first and second wheels contacting a surface under the vehicle and first and second suspension links respectively suspending the first and second wheels from the vehicle and allowing relative movement of the first and second wheels and the vehicle, said suspension system comprising:
a compressible fluid;
a first suspension strut adapted to couple the first suspension link and the vehicle;
a first hydraulic cavity at least partially defined by said first suspension strut and adapted to contain a portion of said compressible fluid and to cooperate with said compressible fluid supply a first suspending spring force that biases the first wheel toward the surface;
a second suspension strut adapted to couple the second suspension link and the vehicle;
a second hydraulic cavity at least partially defined by said second suspension strut and adapted to contain a portion of said compressible fluid and to cooperate with said compressible fluid to supply a second suspending spring force that biases the second wheel toward the surface;
a reservoir adapted to contain a portion of said compressible fluid; and
a volume modulator fluidically connected to said first and second hydraulic cavities and said reservoir and adapted to selectively push said compressible fluid into said first and second hydraulic cavities and vent said compressible fluid from said first and second hydraulic cavities thereby actively modulating said first and second suspending spring forces, wherein said volume modulator defines a modulator cavity receiving compressible fluid and includes a modulator piston adapted to cycle through a compression stroke and an expansion stroke within said modulator cavity for pushing compressible fluid from or drawing compressible fluid into the modulator cavity, a first controllable cavity-side valve coupled between said first hydraulic cavity and said modulator cavity, a second controllable cavity-side valve coupled between said first hydraulic cavity and said modulator cavity, and a controllable reservoir-side valve coupled between said reservoir and said modulator cavity.

13. The suspension system of claim 12 wherein said compressible fluid has a larger compressibility above 2,000 psi than hydraulic oil.

14. The suspension system of claim 12 wherein said compressible fluid is adapted to compress about 1.5% volume at 2,000 psi, about 3% volume at 5,000 psi, and about 6% volume at 10,000 psi.

15. The suspension system of claim 12 further comprising an electric control unit coupled to said volume modulator and adapted to close said first cavity-side valve and open said reservoir-side valve during said expansion stroke and to open said first cavity-side valve and close said reservoir-side valve during said compression stroke, thereby pushing said compressible fluid into said first hydraulic cavity.

16. The suspension system of claim 15 wherein said electric control unit is further adapted to close said second cavity-side valve and open said reservoir-side valve during said expansion stroke and to open said second cavity-side valve and close said reservoir-side valve during said compression stroke, thereby pushing said compressible fluid into said second hydraulic cavity.

17. The suspension system of claim 16 wherein said electronic control unit is further adapted to open said first cavity-side valve and close said reservoir-side valve during said expansion stroke and to close said first cavity-side valve and open said reservoir-side valve during said compression stroke, thereby venting said compressible fluid from said first hydraulic cavity.

18. The suspension system of claim 17 wherein said electronic control unit is further adapted to open said second cavity-side valve and close said reservoir-side valve during said expansion stroke and to close said second cavity-side valve and open said reservoir-side valve during said compression stroke, thereby venting said compressible fluid from said second hydraulic cavity.

19. The suspension system of claim 12 further comprising a pump adapted to pressurize said compressible fluid within said reservoir.

20. The suspension system of claim 12 wherein said compressible fluid includes a silicone fluid.

21. The suspension system of claim 12 wherein said compressible fluid is pressurized in said reservoir to a predetermined amount above atmospheric pressure.

* * * * *